United States Patent
Theiss et al.

(10) Patent No.: US 9,376,882 B2
(45) Date of Patent: Jun. 28, 2016

(54) SELF-ENERGIZING ANNULAR SEAL

(75) Inventors: David H. Theiss, Houston, TX (US);
Christopher G. Kocurek, Houston, TX (US); James A. Burton, Houston, TX (US); Terry L. Shinn, Houston, TX (US); Keith Garbett, Houston, TX (US)

(73) Assignee: OneSubsea IP UK Limited, London, England (GB)

( * ) Notice: Subject to any disclaimer, the term of this patent is extended or adjusted under 35 U.S.C. 154(b) by 923 days.

(21) Appl. No.: 12/682,006

(22) PCT Filed: Nov. 5, 2008

(86) PCT No.: PCT/US2008/082410
§ 371 (c)(1),
(2), (4) Date: Apr. 7, 2010

(87) PCT Pub. No.: WO2009/061768
PCT Pub. Date: May 14, 2009

(65) Prior Publication Data
US 2010/0206575 A1    Aug. 19, 2010

Related U.S. Application Data

(60) Provisional application No. 60/985,502, filed on Nov. 5, 2007.

(51) Int. Cl.
| | |
|---|---|
| *E21B 33/043* | (2006.01) |
| *E21B 33/00* | (2006.01) |
| *E21B 33/12* | (2006.01) |
| *F16J 15/08* | (2006.01) |
| *E21B 33/128* | (2006.01) |

(52) U.S. Cl.
CPC .......... *E21B 33/043* (2013.01); *E21B 33/1212* (2013.01); *E21B 33/1285* (2013.01); *E21B 2033/005* (2013.01); *F16J 15/0887* (2013.01)

(58) Field of Classification Search
CPC .......... F16J 15/028; F16J 15/06; F16J 15/08; F16J 15/0887; F16J 15/121; F16J 15/3236; E21B 2033/005; E21B 33/00; E21B 33/10; E21B 33/12; E21B 33/1212; E21B 33/126; E21B 33/128; E21B 33/1285
USPC .......... 277/500, 530, 566, 567, 609, 616, 647
See application file for complete search history.

(56) References Cited

U.S. PATENT DOCUMENTS

| | | | | |
|---|---|---|---|---|
| 2,754,136 | A | * | 7/1956 | Phillips ..................... 277/322 |
| 2,841,429 | A | * | 7/1958 | McCuistion ................ 277/402 |
| 3,378,269 | A | * | 4/1968 | Castor ....................... 277/336 |

(Continued)

OTHER PUBLICATIONS

PCT/US2008/082410 International Search Report and Written Opinion, Jun. 26, 2009.

*Primary Examiner* — Kristina Fulton
*Assistant Examiner* — Nicholas L Foster
(74) *Attorney, Agent, or Firm* — Chamberlain, Hrdlicka

(57) ABSTRACT

An annular seal assembly for forming a seal between two annular surfaces. The seal assembly includes an annular base including a sealing surface. The seal assembly also includes a pair of spaced apart rims extending from the annular base opposite the base sealing surface and in opposite directions, the rims also including sealing surfaces. The base is elastically deformable and the rims are elastically deformable relative to the base to effect a self-energized seal between the two annular surfaces.

15 Claims, 4 Drawing Sheets

(56) References Cited

U.S. PATENT DOCUMENTS

| | | | |
|---|---|---|---|
| 4,131,287 A * | 12/1978 | Gunderson et al. | 277/328 |
| 4,178,020 A * | 12/1979 | Dopyera | 285/18 |
| 4,529,211 A * | 7/1985 | Rodgers | 277/626 |
| 4,572,515 A | 2/1986 | Grazioli | |
| 4,585,238 A * | 4/1986 | Nicholson | 277/555 |
| 4,592,558 A * | 6/1986 | Hopkins | 277/572 |
| 4,787,642 A * | 11/1988 | Etheridge | 277/550 |
| 5,038,865 A * | 8/1991 | Taylor et al. | 166/387 |
| 5,044,672 A * | 9/1991 | Skeels et al. | 285/98 |
| 5,076,594 A * | 12/1991 | Baugh | 277/615 |
| 5,129,660 A * | 7/1992 | Taylor et al. | 277/328 |
| 5,201,835 A * | 4/1993 | Hosie | 277/314 |
| 5,246,236 A * | 9/1993 | Szarka et al. | 277/337 |
| 5,309,993 A | 5/1994 | Coon et al. | |
| 5,544,707 A | 8/1996 | Hopper et al. | |
| 5,577,472 A * | 11/1996 | Banta et al. | 123/193.3 |
| 5,997,003 A * | 12/1999 | Turner | 277/339 |
| 6,612,371 B2 | 9/2003 | McIntosh et al. | |
| 6,772,844 B2 | 8/2004 | Lloyd et al. | |
| 6,843,480 B2 * | 1/2005 | Nelson et al. | 277/338 |
| 7,559,366 B2 * | 7/2009 | Hunter et al. | 166/217 |
| 7,614,447 B2 * | 11/2009 | Jennings | 166/84.1 |
| 7,959,159 B2 * | 6/2011 | Hocker et al. | 277/559 |
| 8,146,670 B2 * | 4/2012 | Ellis et al. | 166/379 |
| 2002/0140184 A1 * | 10/2002 | Janoff et al. | 277/644 |
| 2003/0209862 A1 * | 11/2003 | Keene et al. | 277/607 |
| 2008/0169610 A1 * | 7/2008 | Curington | 277/312 |
| 2008/0203672 A1 * | 8/2008 | Smith | 277/356 |
| 2009/0194945 A1 * | 8/2009 | Bhat et al. | 277/300 |
| 2011/0120697 A1 * | 5/2011 | Buckle | 166/75.11 |
| 2011/0180275 A1 * | 7/2011 | Shaw | 166/387 |

* cited by examiner

SELF-ENERGIZING ANNULAR SEAL

CROSS-REFERENCE TO RELATED APPLICATIONS

This application is a 35 U.S.C. §371 national stage application of PCT/US2008/082410 filed 5 Nov. 2008, which claims the benefit of U.S. Provisional Patent Application No. 60/985,502 filed 5 Nov. 2007, both of which are incorporated herein by reference in their entireties for all purposes.

STATEMENT REGARDING FEDERALLY SPONSORED RESEARCH OR DEVELOPMENT

Not Applicable.

BACKGROUND

A well capable of producing oil or gas will have a conductor housing secured to a string of conductor pipe, the conductor pipe extending a short depth into the well. A wellhead housing is then landed in the conductor housing and secured to an outer or first string of casing. The first string of casing extends through the conductor to a deeper depth into the well. Depending on the particular conditions of the geological strata above the target zone (typically, either an oil or gas producing zone or a fluid injection zone), one or more additional casing strings will extend through the outer string of casing to increasing depths until the well is cased to its final depth. The outer strings of casing are supported at the upper end by their own casing hangers that are landed in and supported by the wellhead housing. Between each casing hanger and the wellhead housing, a casing hanger seal assembly is set to isolate each annular space between strings of casing. The last, and innermost, string of casing, the production casing, extends into the well to the final depth.

After drilling and installing the casing strings is complete, the well must be completed for production of the production fluids. The production fluids typically flow from the earth formation through perforations made in the production casing at the producing zone. A string of production tubing extends to the producing zone within the production casing to provide a pressure-controlled conduit through which the well fluids are produced. At some point above the producing zone, a packer seals the space between the production casing and the production tubing to ensure that the well fluids flow through the production tubing to the surface. The tubing is supported by a tubing hanger assembly that lands and locks above the production casing hanger. A tubing hanger seal assembly is set to isolate the annular space between the production tubing and the production casing.

At the wellhead, various arrangements of production control valves are arranged in an assembly generally known as a tree installed on the wellhead housing. The tree has one or more production bores containing actuated valves and extending to respective production fluid outlets.

For example, a tree with the arrangement of production control valves offset from the production tubing, generally called horizontal trees, can be used. One type of horizontal tree is a Spool Tree™ shown and described in U.S. Pat. No. 5,544,707, hereby incorporated herein by reference. A horizontal tree also locks and seals onto the wellhead housing. In horizontal trees, however, the tubing hanger locks and seals in the tree bore. With the production valves offset from the production tubing, the production tubing hanger and production tubing may be removed from the tree without having to remove the horizontal tree from the wellhead housing.

The production tubing hanger assembly locks and seals in the drill-through horizontal tree instead of in the wellhead housing. However, the annular space where the tubing hanger seal assembly resides does not always remain constant as pressure and thermal expansion and external forces act on the elements that bound the annular space. Also asymmetric geometry of the members that form the bore or the mandrel can cause asymmetric deflections as loads are applied to the members. The tubing hanger seal assembly should be compliant in the radial direction to conform to these movements of the seal surfaces and maintain sufficient contact pressures with the seal surfaces to maintain a seal for all conditions.

BRIEF DESCRIPTION OF THE DRAWINGS

For a more detailed description of the embodiments, reference will now be made to the following accompanying drawings.

DETAILED DESCRIPTION OF THE EMBODIMENTS

Figure 1B:
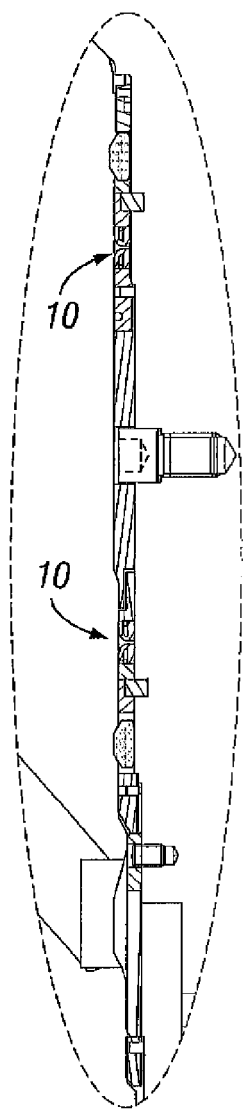
FIG. 1B is an enlarged cross sectional view of the horizontal tree of FIG. 1A.

In the drawings and description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Figure 1A:
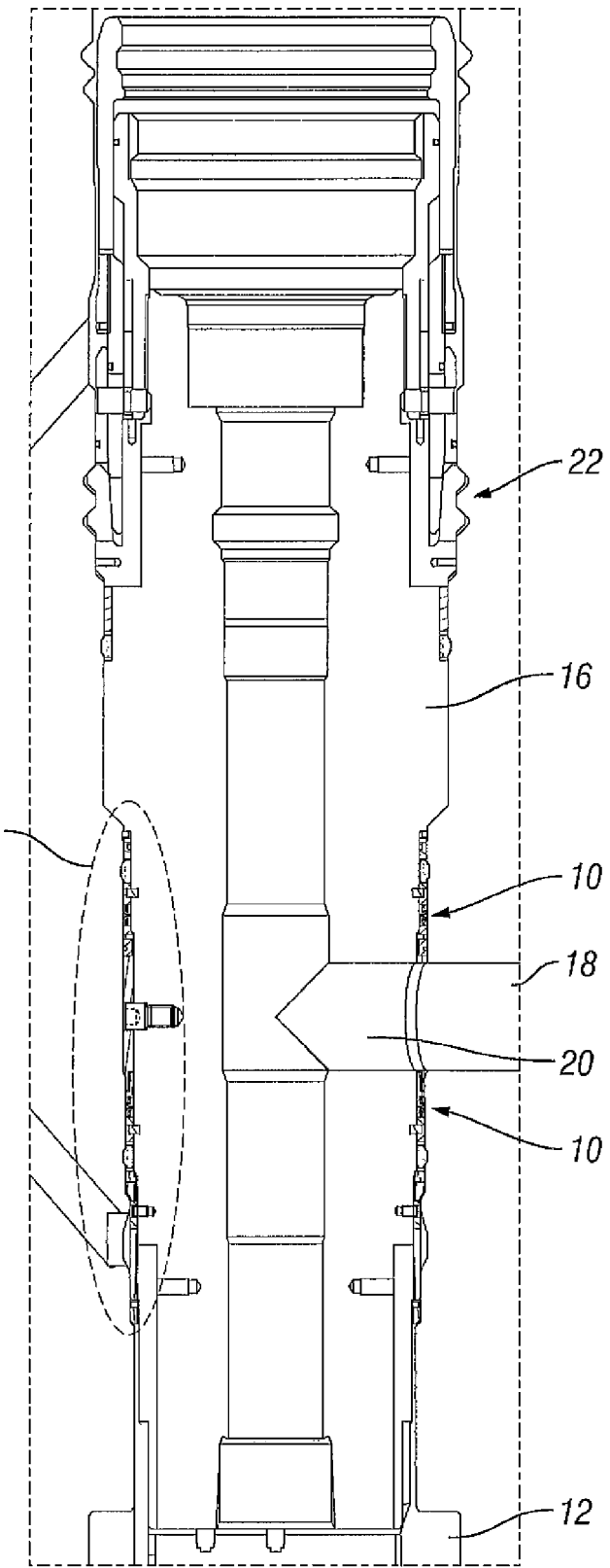
FIG. 1A is a cross section elevation view of a horizontal tree with a tubing hanger installed.

FIGS. 1A-B, 2A, and 3A-B illustrate an embodiment of a seal assembly 10 used in the context of a horizontal tree 14. FIGS. 1A-B show a seal assembly 10 installed in the through bore 12 of the tree 14 as part of a tubing hanger 16 supporting the production tubing. The lower terminal end of the tree 14 is connected and sealed to a wellhead housing (not shown). The upper terminal end of the tree 14 is connected and sealed to a blowout preventer (BOP) (not shown). The tree 14 includes transverse bores opening into the through bore 12, including a production outlet 18 that interfaces with a production bore 20 of the tubing hanger 16. Once in position, a tubing hanger locking assembly 22 locks the tubing hanger 16 into position within the tree 14.

Figure 2A:
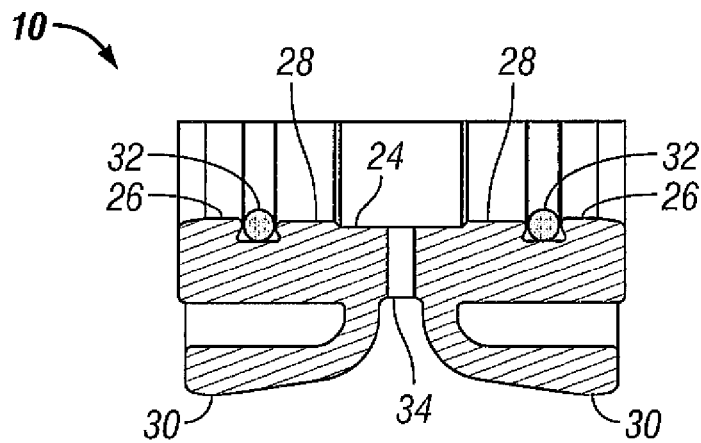
FIG. 2A is a cross-sectional cut-away view of an exemplary seal assembly.

As shown, the tubing hanger 16 includes two seal assemblies 10, one below the production outlet 18 and one above. The seal assemblies 10 are annular seals and thus isolate the interface between the production outlet 18 and the production bore 20 from the annulus surrounding the tubing hanger 16 both above and below the seal assemblies 10. As best shown in FIG. 2A, the seal assembly 10 includes a base 24 that is essentially cylindrical in shape. The base portion 24 includes sealing bands 26 that are raised from the remaining portion of the base surface 28 to engage and seal against a surface with an interference fit. The configuration and material of the base portion 24 are designed such that the base portion 24 can store elastic energy upon expansion or contraction of the seal assembly 10, which is explained further below. The sealing bands 26 concentrate contact pressure into bands to concentrate contact pressure to effect the seal against the tubing hanger 16. The base 24 also supports any axial loads exerted on the seal assembly 10 due to a pressure differential between one end of the seal and the other. Extending from the base 24 are two rims 30, both extending away from the base 24 and then curving in opposite directions. The rims 30 have a tapered section profile such that they can store elastic energy as the ends of the rims 30 are deflected, which is explained further below. The rims 30 are also designed to have sufficient strength to resist plastic deformation when fluid pressure is applied to either end or both ends of the seal assembly 10. Thus, the interface between the base 24 and the rims 30 forms an elastic and partially plastic "hinge" to accommodate relative movement between the ends of the rims 30 and the base 24.

The seal assembly 10 may be made from any suitable sealing material having elastic behavior, such as metal. For example, the seal assembly 10 may be made of Nickel alloy 718. It should be appreciated, however, that other materials, such as elastomeric materials may also be used. Additional the seal assembly 10 may be silver-plated. The silver plating acts as a lubricant for installation procedures described below and, because silver is a relatively soft material, is capable of deformation to fill in surface imperfections on the sealing surfaces.

As shown the seal assembly also optionally includes elastomeric seal elements 32 to serve as back-up seals to the seal formed by the sealing bands 26. As an example, the elastomeric seal elements 32 may in the form of O-rings placed in grooves on the base 24. The seal assembly 10 further includes at least one pressure relief port 34 extending through the base 24 between the rims 30. The pressure relief port 34 allows pressure to balance across the base 24 during installation and setting of the seal assembly 10.

The installation and setting procedure will now be described. As previously explained, the tubing hanger 16 is lowered into the tree 14 when installed. As shown in FIGS. 1A-B and 3A-B, the seal assemblies 10 are installed on the outside of the tubing hanger 16. For installation, the seal assemblies 10 are slid onto the outside of the tubing hanger 16 before the production tubing is attached. The initial outer diameter of the tubing hanger 16 is sized to allow clearance between the seal assembly 10 and the hanger 16. However, the outside diameter of the tubing hanger 16 typically gradually increases over a certain distance on a taper before the area where the seal assemblies 10 are to be finally located. Because of the gradual increase in outer diameter, the seal assembly 10 engages the hanger 16 and is then expanded as the seal assembly 10 travels further across the hanger 16. When in the final installation position, the seal assembly 10 is expanded enough such that the sealing bands 26 seal against the outside of the hanger 16 with an interference fit. If included, the optional seal elements 32 also form a seal against the outside of the hanger 16. To hold the seal assemblies in place, FIGS. 3A and B illustrate stop rings 36 on either side of each seal assembly 10 that are held in place using snap rings 38. The stop rings 36 serve to hold the seal assemblies 10 in place as well as absorb at least some of the axial load placed on the seal assemblies 10 during setting. Some of the axial load may also be resisted by the friction between the base portion 24 and the tubing hanger 16. It should be appreciated that other means for holding the seal assemblies may be used as long as axial movement along the tubing hanger 16 is limited, such as the configuration shown in FIGS. 1A and B.

Figure 3A:
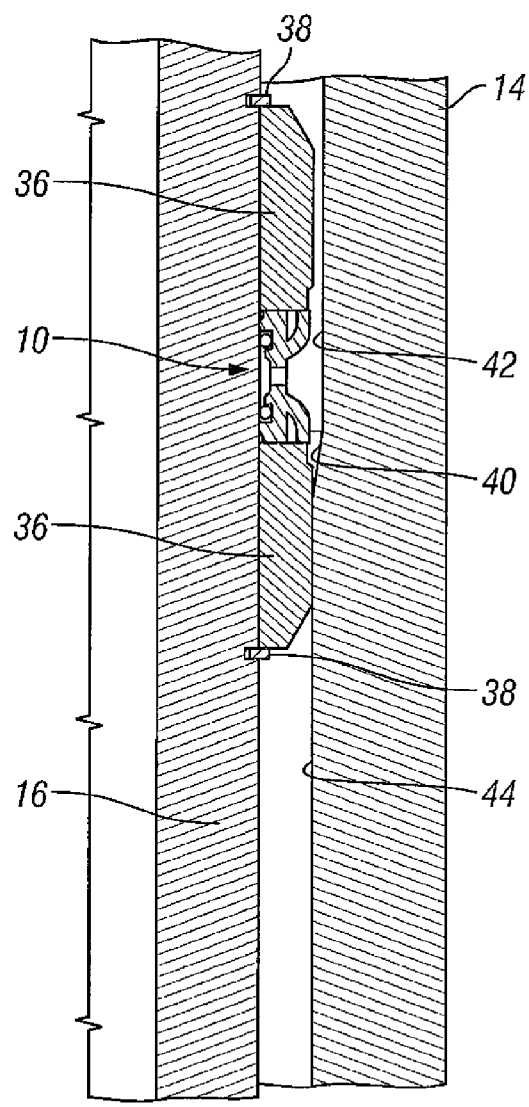
FIG. 3A is a partial sectional view of a seal assembly positioned between two tubular members immediately prior to being moved into a set condition.
Figure 3B:
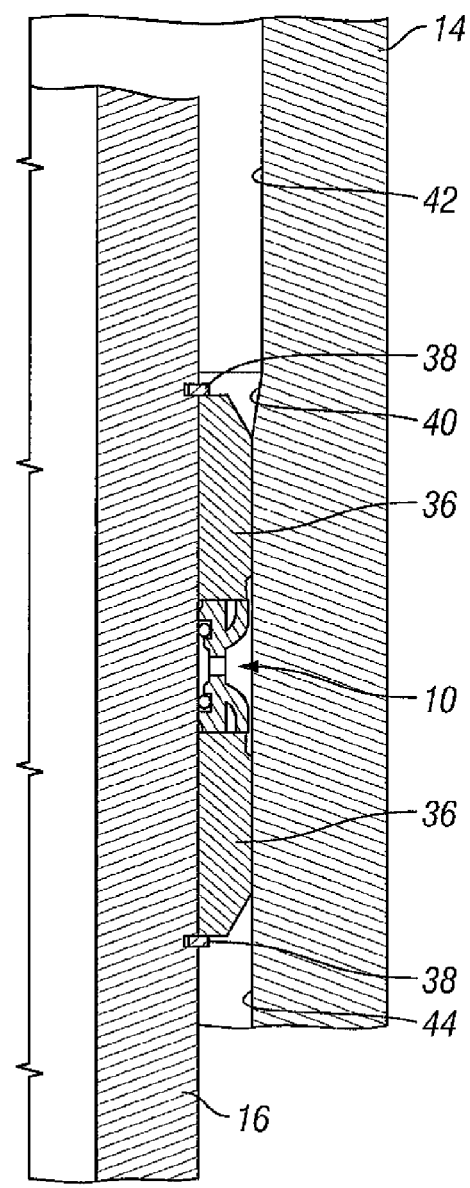
FIG. 3B is a partial sectional view of the form of the invention shown in FIG. 3A with the seal assembly in a set condition.

The downward movement of the seal assembly 10 within the tree 14 is shown in the two positions in FIGS. 3A and B. In FIG. 3A, the tubing hanger 16 is moving downward within the tree 14 with the seal assembly 10 is in an enlarged diameter bore 42 and approaching a tapered portion setting bore 40. In FIG. 3B, the tubing hanger 16 has moved downwardly to the point that the seal assembly 10 is in sealing engagement with the bore of the tree 14 and thus provides a sealing engagement against the exterior of the tubing hanger 16 and against the interior of the tree 14. As shown in FIG. 3B, the tubing hanger 16 has been moved downwardly with respect to the tree 14 so that the seal assembly 10 is moved into the reduced diameter bore 44, thereby becoming mechanically set by the tapered setting surface 40. As the seal assembly moves from the position shown in FIG. 3A to the position shown in FIG. 3B, the rims 30 are compressed as they engage the tapered setting bore 40 and continue to compress until they reach the final set position shown in FIG. 3B. Once set, the rims 30 form a seal against the bore of the tree 14 by interference fit contact. As designed, although the rims deflect, the rims 30 store elastic energy as the ends of the rims 30 are deflected as they engage and seal against the inner bore of the tree 14. The rims 30 are also designed to have sufficient strength to resist plastic deformation when fluid pressure is applied to either end or both ends of the seal assembly when production of well fluids is initiated. Again, the interface between the base 24 the flexible rims 30 forms a elastic and partially plastic "hinge" to accommodate relative movement between the ends of the rims 30 and the base 24. When set in this fashion, the seal assemblies are "self-energizing" in that the seals are formed based on the interference fit of the seal assembly 10 between the tubing hanger 16 and the tree 14. However, additional sealing ability is realized due to the configuration of the rims 30 when fluid pressure is applied to either end of the seal assembly 10. Once fluid pressure is applied, the fluid pressure provides additional force that increases the sealing ability of the seal assembly 10. A feature of the seal assembly 10 is that the seal assembly 10 is capable of reliably sealing against fluid pressure from either or both axial directions in the bore of the tree 14.

When set, the seal assembly 10 is able to maintain the seal despite the annular space between the tree 14 and the tubing hanger 16 not always remaining constant, such as when pressure and thermal expansion or external forces act on the tubing hanger 16 and the tree 14. Additionally, any asymmetric deflections caused by the asymmetric geometry of the tree 14 or the tubing hanger 16 may be absorbed because the seal assembly 10 is compliant in the radial direction. Thus, the seal assembly 10 can maintain sufficient contact pressures with the seal surfaces on the tree 14 and the tubing hanger 16 to maintain a seal under dynamic conditions.

Additionally, although described such that the base 24 seals against the tubing hanger 16 and the rims 30 against the tree 14, the seal assembly may also be reversed where the seal assembly 10 is installed on the tubing hanger 16 with the rims 30 forming a seal against the hanger 16 and the base 24 set to form a seal against the tree 14.

Figure 2B:
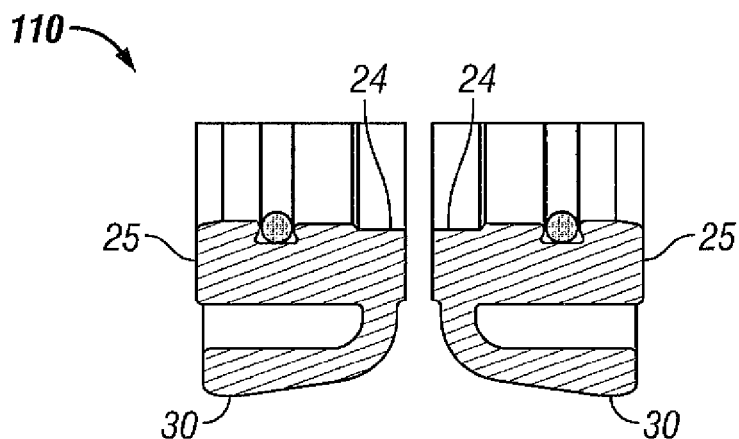
FIG. 2B is a cross-sectional cut-away view of an alternative seal assembly.

It should also be appreciated that while the seal assembly 10 is described in the context of setting a tubing hanger in a tree bore, the seal assembly 10 is useful in other applications as well, including those outside the oil and gas industry. The seal assembly 10 may thus be useful in any number of situations where In any situation where a seal is needed between two surfaces Another embodiment 110 of the seal assembly is shown in FIG. 2B As shown, the seal assembly 110 is similar to the seal assembly 10 but instead of a single unit, the seal assembly 110 includes stacked, unidirectional seal assemblies in which two seal bodies 25 with single rims 30 are stacked so that the base 24 is actually two pieces and the rims disposed in opposite radial directions. Also, the seal assembly 110 may only comprise a unidirectional seal where a base 24 with only a single rim 30 is used.

Figure 2C:
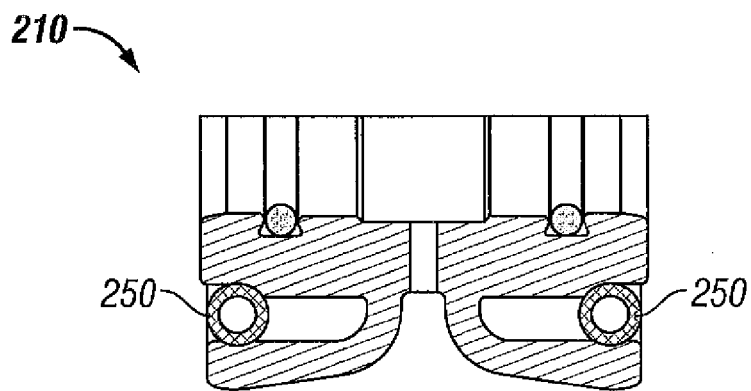
FIG. 2C is a cross-sectional cut-away view of an alternative seal assembly.

Another embodiment 210 of the seal assembly is shown in FIG. 2C. As shown, the seal assembly 210 is similar to the seal assembly 10 but includes the addition of annular springs 250 between the base 24 and each rim 30. The springs provide an additional source of elastic energy for the seal assembly 110. The springs assist by resisting the expansion of the base portion 24 during installation to help force the sealing bands 26 into sealing contact with the tubing hanger 16. The springs also assist in forcing the rims 30 into interference contact against the inside of the tree 14 during the setting of the seal assembly 210. Radial load can thus be transferred through the springs 150 to enhance the seal contact pressure at either the sealing bands 26 or the rims 30. The springs may be any suitable high strength, corrosion resistant material, such as ELGILOY® that has as high an elastic range as possible or even a non-metallic material. The annular springs 250 may be coil springs, helical wound springs, leaf springs, or any other suitable configuration. Additionally, although not shown the springs 250 may be used in the seal assembly 110 shown in FIG. 2B.

Figure 2D:
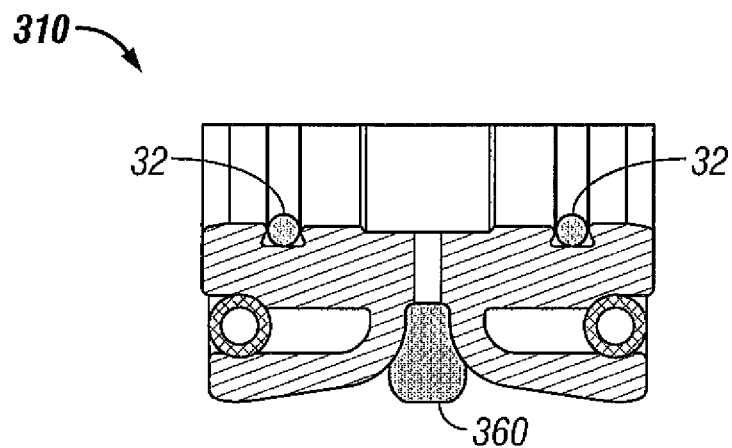
FIG. 2D is a cross-sectional cut-away view of an alternative seal assembly.

Another embodiment 310 of the seal assembly is shown in FIG. 2D. As shown, the seal assembly 310 is similar to the seal assembly 10 but includes an external secondary seal 360 in addition to the elastomeric seal elements 32. The external secondary seal 360 serves to form a back-up seal between the seal assembly 310 and the inside of the tree 14 when the seal assembly 310 is set. With the location of the external secondary seal 360, however, the seal assembly 310 no longer includes the pressure relief port 34. Additionally, the seal assembly 310 may optionally not include the springs 250 as shown in FIG. 2C.

Figure 2E:
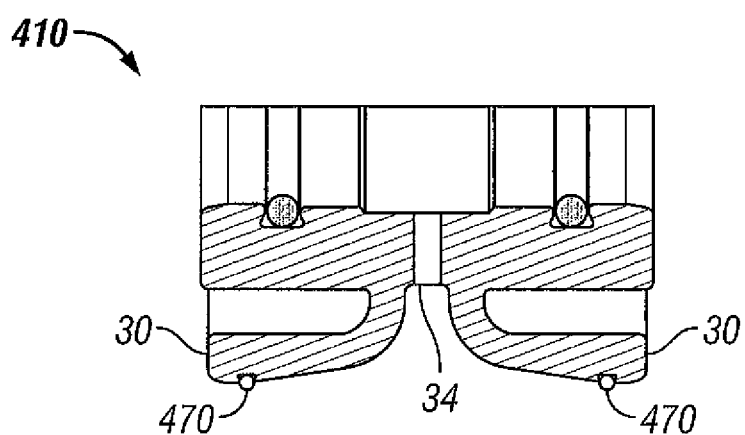
FIG. 2E is a cross-sectional cut-away view of an alternative seal assembly.

Another embodiment 410 of the seal assembly is shown in FIG. 2E. The seal assembly 410 is similar to the seal assembly 10 but includes external secondary seals 470 in addition to the elastomeric seal elements 32. The external secondary seals 470 serve to form back-up seals between the seal assembly 410 and the inside of the tree 14 when the seal assembly 410 is set. With the location of the external secondary seals 470 being on the rims 30, however, the seal assembly 410 may still include the pressure relief port 34. Additionally, although not shown, the seal assembly 410 may include the springs 250 as shown in FIG. 2C.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed is:

1. An annular seal assembly for forming a self-energized seal between two annular surfaces, the seal assembly comprising:
    an annular base comprising sealing bands, wherein the sealing bands are radially raised with respect to the annular base and include approximately cylindrical sealing surfaces such that, before deformation, cross-sections of the sealing surfaces are substantially flat, and wherein the annular base is elastically deformable due to interference contact with one of the annular surfaces to effect a seal against the annular surface over the sealing bands; and
    a pair of spaced apart approximately cylindrical rims, each rim connected to the annular base only near an axial middle portion of the annular base, each rim extending radially from the connection with the annular base opposite the sealing bands, and each rim extending in opposite axial directions away from each other and not directly connected to each other, the rims including sealing surfaces, the rims being elastically deflectable toward the annular base due to interference contact with the other annular surface to effect a seal against the other annular surface over a range of deflection;
    the rims arranged to form a space between the annular base and each rim such that fluid pressure within the spaces is capable of further effecting the seals; and
    the annular base and the rims comprising a non-elastomeric materal.

2. The seal assembly of claim 1, wherein the base sealing bands include base secondary seals.

3. The seal assembly of claim 1, further including annular coil springs between the annular base and each of the rims and positioned to provide resistive radial force to the compression of the rims toward the annular base.

4. The seal assembly of claim 1, wherein the annular base and rims form a single body.

5. The seal assembly of claim 1, wherein the annular base and rims are formed into more than one body.

6. The seal assembly of claim 1, wherein the annular base and rims are metal.

7. The seal assembly of claim 1, further including a rim secondary seal.

8. The seal assembly of claim 7, wherein the rim secondary seal is located between the rims.

9. The seal assembly of claim 7, further including more than one rim secondary seal, each rim secondary seal including a seal on each rim sealing surface.

10. The seal assembly of claim 1, wherein the rims are elastically deformable relative to the annular base to accommodate relative movement between ends of the rims and the annular base and maintain a seal between annular surfaces under dynamic conditions.

11. The seal assembly of claim 1, wherein the base is essentially cylindrical.

12. The seal assembly of claim 1, further comprising a port extending through the base between the rims to allow fluid pressure balance across the base.

13. A method of forming an annular seal between first and second annular surfaces, the method including:
forming a seal between the first annular surface and approximately cylindrical sealing surfaces of a base of an annular seal assembly by elastically deforming the annular seal assembly around the first annular surface with an interference fit, wherein a cross-section of the approximately cylindrical sealing surfaces is substantially flat before deformation and the approximately cylindrical sealing surfaces each comprime a sealing band that is radially raised with respect the base; and
forming a seal between the annular seal assembly and the second annular surface with an interference fit by radially elastically deforming two rims due to deflection from the second annular surface, each rim connected to the annular base only near an middle portion of the annular base, each rim extending radially from the connection point with the base of the annular seal assembly opposite the raised sealin bands, and each rim extending in opposite axia directions away from each other and not directly connected to each other, the rims arranged to form a space between the base and each rim such that fluid pressure within the spaces is capable of futher effecting the seals,the base and the rims comprising a non-elastomeric material.

14. The method of claim 13, wherein the base is essentially cylindrical.

15. The method of claim 13, wherein the base is arranged such that fluid pressure is capable of passing through the base.

* * * * *